(12) United States Patent
Davydov et al.

(10) Patent No.: US 9,398,559 B2
(45) Date of Patent: Jul. 19, 2016

(54) LINK ADAPTATION IN COORDINATED MULTIPOINT SYSTEM

(75) Inventors: Alexei Vladimirovich Davydov, Nizhny Novgorod (RU); Gregory Vladimirovich Morozov, Nizhny Novgorod (RU); Alexander Alexandrovich Maltsev, Nizhny Novgorod (RU); Ilya Alexandrovich Bolotin, Nizhny Novgorod (RU); Vadim Sergeyevich Sergeyev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 256 days.

(21) Appl. No.: 13/976,370

(22) PCT Filed: Mar. 29, 2012

(86) PCT No.: PCT/RU2012/000234
§ 371 (c)(1),
(2), (4) Date: Sep. 3, 2013

(87) PCT Pub. No.: WO2013/066204
PCT Pub. Date: May 10, 2013

(65) Prior Publication Data
US 2013/0336269 A1 Dec. 19, 2013

Related U.S. Application Data

(60) Provisional application No. 61/556,109, filed on Nov. 4, 2011.

(51) Int. Cl.
*H04W 72/08* (2009.01)
*H04W 52/02* (2009.01)
(Continued)

(52) U.S. Cl.
CPC ............. *H04W 68/02* (2013.01); *H04B 7/024* (2013.01); *H04B 7/0456* (2013.01); *H04J 3/12* (2013.01);
(Continued)

(58) Field of Classification Search
CPC .............. H04L 1/0026; H04L 1/0077; H04L 25/03898; H04W 24/02; H04W 52/146; H04W 52/244; H04W 52/34; H04W 72/042; H04W 72/085; H04B 7/024; H04B 7/0456
See application file for complete search history.

(56) References Cited

U.S. PATENT DOCUMENTS 8,593,989 B2* 11/2013 Sun ..................... H04B 7/024
370/252
8,737,514 B2* 5/2014 Davydov et al. ............. 375/267
(Continued)

FOREIGN PATENT DOCUMENTS

KR 10-2010-0081913 A 7/2010
KR 10-2011-0035807 A 4/2011
(Continued)

OTHER PUBLICATIONS

Zhu et al, A Practical Design of Downlink Coordinated Multi-Point Transmission for LTE-Advanced, DOCOMO Beijing Communications Laboratories Co., Ltd, China, 2010, IEEE, 6 pages.*
(Continued)

*Primary Examiner* — Ahmed Elallam
(74) *Attorney, Agent, or Firm* — Schwabe, Williamson & Wyatt, P.C.

(57) ABSTRACT

Embodiments of the present disclosure describe devices, methods, computer-readable media and systems configurations for link adaptation within coordinated multipoint systems. In various embodiments, a mobile terminal may determine link adaptation feedback information and feed back the information to a base station. The base station may adjust a channel quality indicator of the link adaptation feedback information based on loading of nodes within a coordinated multipoint measurement set. Other embodiments may be described and/or claimed.

27 Claims, 5 Drawing Sheets

(51) Int. Cl.

| | | |
|---|---|---|
| H04W 68/02 | (2009.01) | |
| H04W 72/04 | (2009.01) | |
| H04B 7/02 | (2006.01) | |
| H04B 7/04 | (2006.01) | |
| H04W 4/06 | (2009.01) | |
| H04W 24/02 | (2009.01) | |
| H04W 4/00 | (2009.01) | |
| H04W 52/24 | (2009.01) | |
| H04J 3/12 | (2006.01) | |
| H04L 5/00 | (2006.01) | |
| H04L 5/14 | (2006.01) | |
| H04W 52/14 | (2009.01) | |
| H04L 1/00 | (2006.01) | |
| H04L 27/26 | (2006.01) | |
| H04W 76/00 | (2009.01) | |
| H04W 76/02 | (2009.01) | |
| H04W 52/34 | (2009.01) | |
| H04W 84/14 | (2009.01) | |

(52) U.S. Cl.
CPC .......... *H04L 1/0026* (2013.01); *H04L 1/0077* (2013.01); *H04L 5/0055* (2013.01); *H04L 5/0078* (2013.01); *H04L 5/14* (2013.01); *H04L 27/2662* (2013.01); *H04W 4/005* (2013.01); *H04W 4/06* (2013.01); *H04W 24/02* (2013.01); *H04W 52/146* (2013.01); *H04W 52/242* (2013.01); *H04W 72/042* (2013.01); *H04W 72/085* (2013.01); *H04W 76/002* (2013.01); *H04W 76/021* (2013.01); *H04W 52/244* (2013.01); *H04W 52/34* (2013.01); *H04W 84/14* (2013.01); *Y02B 60/50* (2013.01)

(56) References Cited

U.S. PATENT DOCUMENTS

| | | | |
|---|---|---|---|
| 2008/0101280 A1 | 5/2008 | Gholmieh et al. | |
| 2008/0219376 A1 | 9/2008 | Qi et al. | |
| 2010/0271968 A1* | 10/2010 | Liu et al. | 370/252 |
| 2010/0322176 A1* | 12/2010 | Chen et al. | 370/329 |
| 2011/0171955 A1 | 7/2011 | Acharya | |
| 2011/0199986 A1* | 8/2011 | Fong et al. | 370/329 |
| 2012/0140694 A1* | 6/2012 | Sun et al. | 370/312 |
| 2012/0155291 A1* | 6/2012 | Koivisto et al. | 370/252 |
| 2012/0213261 A1* | 8/2012 | Sayana et al. | 375/224 |
| 2012/0287799 A1* | 11/2012 | Chen et al. | 370/252 |
| 2013/0021925 A1* | 1/2013 | Yin | H04B 7/024 370/252 |
| 2013/0208604 A1* | 8/2013 | Lee | H04L 25/0226 370/252 |

FOREIGN PATENT DOCUMENTS

| | | |
|---|---|---|
| WO | WO2010/101431 A2 | 9/2010 |
| WO | WO2011/038410 A1 | 3/2011 |

OTHER PUBLICATIONS

International Search Report and Written Opinion mailed Jul. 26, 2012 from International Application No. PCT/RU2012/000234.

Office Action issued Mar. 4, 2015 from Korean Patent Application No. 2014-7012054.

Office Action issued May 26, 2015 from Japanese Patent Application No. 2014-539904.

Intel Corporation, "Discussion on CQI definition in CoMP Systems," 3GPP TSG-RAN WGI #66bis, R1-112913, Oct. 10-14, 2011, Zhuhai, China, 7 pages.

Extended European Search Report mailed Sep. 18, 2015 for European Application No. 12844977.4, 10 pages.

ZTE: "CQI computation for CoMP", 3GPP Draft; R1-113009_COMP_CQI, 3rd Generation Partnership Project (3GPP), Mobile Competence Center; 650, Route Des Lucioles; F-06921 Sophia-Antipolis Cedex; France, vol. RAN WG1, No. Zhuhai, China; Oct. 10-14, 2011, 6 pages.

NTT DOCOMO: "System Performance of CS/CB-ComMP in Scenario 3", 3GPP Draft; R1-112722 DL Comp CSCB, 3rd Generation Partnership Project (3GPP), Mobile Competence Center; 650, Route Des Lucioles; F-06921 Sophia-Antipolis Cedex; France, vol. RAN WG1, No. Athens, Greece; Aug. 22-26, 2011, 7 pages.

Interdigital Communications et al: "CoMP Phase 2 performance results", 3GPP Draft; R1-112238 IDCC Comp Phase 2 Results, 3rd Generation Partnership Project (3GPP), Mobile Competence Center; 650, Route Des Lucioles; F-06921 Sophia-Antipolis Cedex; France, vol. RAN WG1, No. Athens, Greece; Aug. 22-26, 2011, 5 pages.

Fujitsu: "CoMP Cell Set Configuration", 3GPP Draft; R2-093075 Comp Cell Set Configuration, 3rd Generation Partnership Project (3GPP), Mobile Competence Center; 650, Route Des Lucioles; F-06921 Sophia-Antipolis Cedex; France, vol. RAN WG1, No. San Francisco, USA; May 4-8, 2009, 5 pages.

ZTE: "CoMP Phase 1 JP Evaluation Results", 3GPP Draft; R1-111516, 3RD Generation Partnership Project (3GPP), Mobile Competence Center; 650, Route Des Lucioles; F-06921 Sophia-Antipolis Cedex; France, vol. RAN WG1, No. Barcelona, Spain; May 9-13, 2011, 5 pages.

Huawei: "Evaluation on muting benefit for 1-8 CSI RS design", 3GPP Draft; R1-103446 Evaluation on Muting Benefits for CSI RS Design, 3rd Generation Partnership Project (3GPP), Mobile Competence Center; 650, Route Des Lucioles; F-06921 Sophia-Antipolis Cedex; France, vol. RAN WG1, No. Dresden, Germany; Jun. 28-Jul. 2, 2010, 7 pages.

* cited by examiner

LINK ADAPTATION IN COORDINATED MULTIPOINT SYSTEM

CROSS REFERENCE TO RELATED APPLICATIONS

The present application is a national phase entry under 35 U.S.C. §371 of International Application No. PCT/RU2012/000234, filed Mar. 29, 2012, entitled "LINK ADAPTATION IN COORDINATED MULTIPOINT SYSTEM", which claims priority to U.S. Provisional Patent Application No. 61/556,109, filed Nov. 4, 2011, the entire contents and disclosures of which are hereby incorporated by reference in their entireties.

FIELD

Embodiments of the present invention relate generally to the field of communications, and more particularly, to link adaption in coordinated multipoint systems.

BACKGROUND

Coordinated multipoint (CoMP) systems have been developed in order to improve various operational parameters in wireless networks. CoMP systems utilize one or more coordinating nodes that cooperate with a serving node to improve communications with user equipment. Channel quality indicators for a CoMP system are defined as per-point (e.g., per channel state information (CSI)—reference signal (RS)—resource) CQI feedback assuming interference outside of the CoMP measurement set. Interference estimation may be a challenge in these systems. For example, nodes of a CoMP measurement set may be different with respect to different UEs. Therefore, it may be difficult to estimate the interference on a physical downlink shared channel (PDSCH) outside of a particular CoMP measurement set.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Illustrative embodiments of the present disclosure include, but are not limited to, methods, systems, and apparatuses for link adaption in a coordinated multipoint (CoMP) measurement set of wireless communication network.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B'". The phrase "at least one of A, B and C'" means (A), (B), (C), (A and B), (A and C), (B and C) or (A, B and C). The phrase "(A) B" means (B) or (A and B), that is, A is optional.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
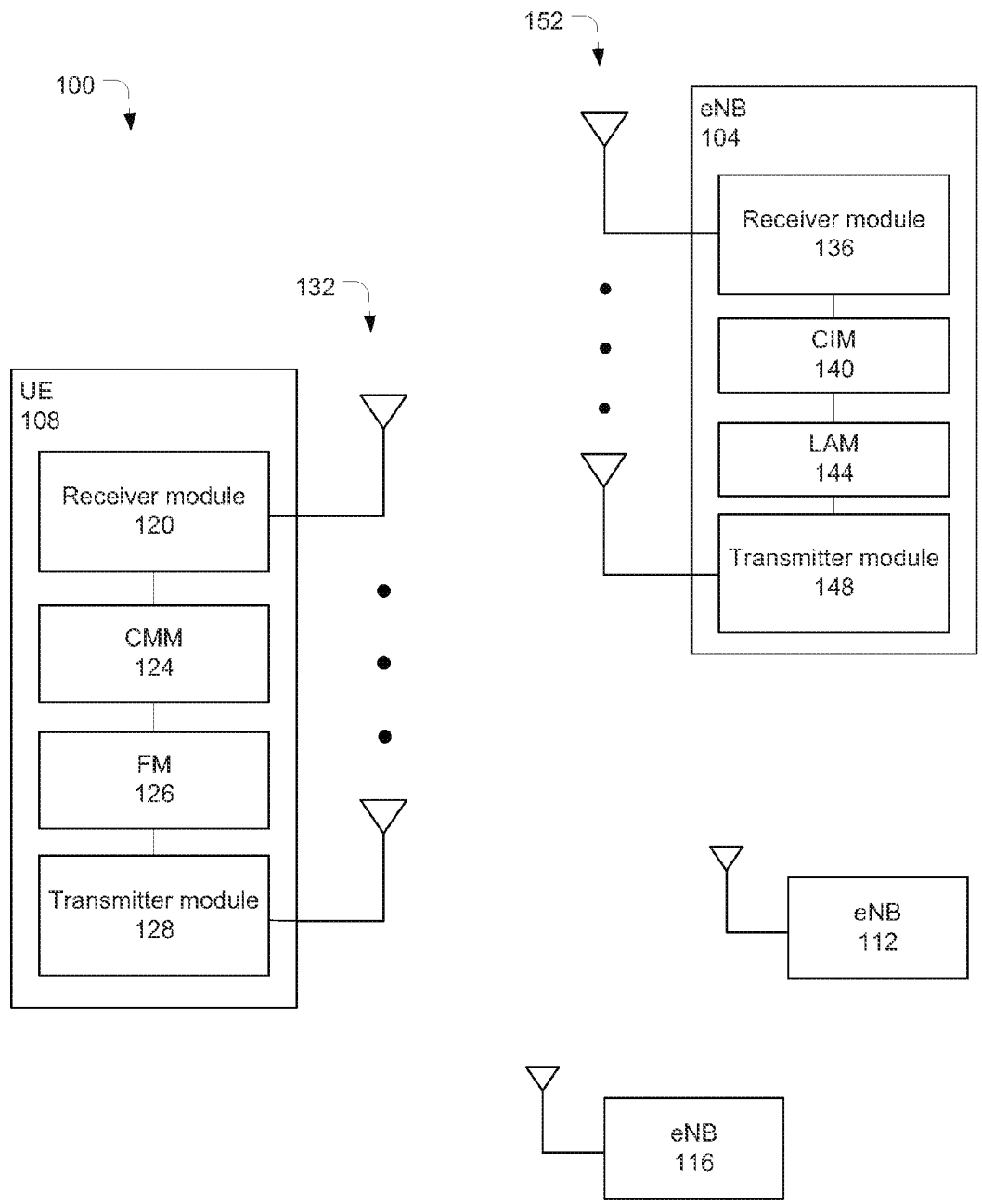
FIG. 1 schematically illustrates a wireless communication network in accordance with various embodiments.

FIG. 1 schematically illustrates a wireless communication network 100 in accordance with various embodiments. Wireless communication network 100 (hereinafter "network 100") may be an access network of a 3rd Generation Partnership Project (3GPP) long-term evolution (LTE) network such as evolved universal mobile telecommunication system (UMNITS) terrestrial radio access network (E-UTRAN). The network 100 may include a base station, e.g., enhanced node base station (eNB) 104, configured to wirelessly communicate with a mobile terminal, e.g., user equipment (UE) 108. While embodiments of the present invention are described with reference to an LTE network, some embodiments may be used with other types of wireless access networks.

At least initially, the eNB 104 may have an established wireless connection with the UE 108 and may operate as a serving node within a CoMP measurement set. One or more additional eNBs of the network 100, e.g., eNBs 112 and 116, may also be included within the CoMP measurement set. eNBs 112 and 116 may be configured to facilitate wireless communication with the UE 108 through coordination with the eNB 104. The one or more additional eNBs may be collectively referred to as "coordinating nodes." An eNB may transition between coordinating and serving node roles.

The CoMP measurement set may be any type of system that coordinates operation of a serving node and one or more coordinating nodes to facilitate communication with a user equipment. The serving node and coordinating nodes of a CoMP measurement set may communicate with one another over a wireless connection and/or a wired connection (e.g., a high-speed fiber backhaul connection). In various embodiments, the CoMP measurement set may employ a CoMP scheme such as joint transmission (JT) CoMP, dynamic point selection (DPS) CoMP, and/or cooperating scheduling and cooperative beamforming (CS/CB) CoMP.

The eNBs may each have generally the same transmission power capabilities as one another or, alternatively, some of the eNBs may have relatively lower transmission power capabilities. For example, in one embodiment the eNB 104 may be a relatively high-power base station such as a macro eNB, while the eNBs 112 and 116 may be relatively low-power base stations, e.g., pico eNBs and/or femto eNBs.

The UE 108 may include a receiver module 120, a channel measurement module (CMM) 124, a feedback module (FM) 126, and a transmitter module 128 coupled with one another at least as shown. The receiver module 120 and transmitter module 128 may each be further coupled with one or more of a plurality of antennas 132 of the UE 108.

The UE 108 may include any number of suitable antennas. In various embodiments, the UE 108 may include at least as many antennas as a number of simultaneous spatial layers or streams received by the UE 108 from the eNBs, although the scope of the present disclosure may not be limited in this respect. The number of simultaneous spatial layers or streams may also be referred to as transmission rank, or simply rank.

One or more of the antennas 132 may be alternately used as transmit or receive antennas. Alternatively, or additionally, one or more of the antennas 132 may be dedicated receive antennas or dedicated transmit antennas.

eNB 104 may include receiver module 136, channel interference module (CIM) 140, link adaptation module (LAM) 144, and transmitter module 148 coupled with one another at least as shown. Receiver module 136 and transmitter module 148 may each be further coupled with one or more of a plurality of antennas 152 of the eNB 104. The eNB 104 may include any number of suitable antennas. In various embodiments, the eNB 104 may include at least as many antennas as a number of simultaneous transmission streams transmitted to the UE 108, although the scope of the present disclosure may not be limited in this respect. One or more of the antennas 152 may be alternately used as transmit or receive antennas. Alternatively, or additionally, one or more of the antennas 152 may be dedicated receive antennas or dedicated transmit antennas.

Though not shown explicitly, the eNBs 112 and 116 may include modules/components similar to those of the eNB 104.

In various embodiments, CMM 124 may measure aspects of channel conditions, e.g., signal-to-noise plus interference ratio (SNIR), fading correlation, etc., based on signals received by the receiver module 120. The FM 126 may then feed back channel state information (CSI), via the transmitter module 128, to the serving node based on measured aspects. In some embodiments, the CSI may additionally/alternatively be fed back to one or more of the cooperating nodes.

The channel state information may include precoding matrix indicator (PMI), rank indicator (RI), and/or channel quality indicator (CQI) that may be used to adapt a communication link used to communicatively couple the UE 108 and the serving node. For example, PMI may be an index to a preferred precoding matrix within a codebook. The preferred precoding matrix may include one or more precoding vectors that may be used by the eNB 104 to attach a spatial signature to downlink transmissions, such as by applying a beamforming vector. The RI may be used to indicate a desired rank and the CQI may be used to determine modulation and coding scheme (MCS).

In determining the CQI it may be desired for the UE 108 to determine interference that occurs outside of the CoMP measurement set within which the UE 108 is located. One approach to derive desired interference power at the UE 108 is to subtract the interference components of the CoMP measurement set from the total estimated interference power as follows:

$$\sigma_{out}^2 = \sigma_{full}^2 - \sum_{i=2}^{N} E(\|H_i v_i\|^2), \quad \text{Equation 1}$$

where $\sigma_{out}^2$ is the desired interference power, $\sigma_{full}^2$ is the total interference power estimated on the physical downlink shared channel (PDSCH), $H_i$ is the channel from the $i^{th}$ point (or "node") of the CoMP measurement set estimated at the UE 108 based on channel state information reference signal (CSI-RS) from corresponding node, $v_i$ is the beamforming vector (or set of vectors) assumed at the UE 108 for interference estimation, and N is number of points in the CoMP measurement set.

A complication of this approach is that the UE 108 may not have information on the actual beamforming and, more importantly, about PDSCH scheduling decisions at the cooperating nodes of the CoMP set. In this case, the interference estimation outside of the CoMP set may be inaccurate, especially in bursty traffic conditions where some of the cooperating nodes may not be active at the time of interference measurement.

Accordingly, various embodiments provide alternative schemes for CQI calculation and interference estimation to facilitate operation within a CoMP system.

In an embodiment, the CMM 124 may perform per-point CQI calculation using $\sigma_{full}^2$ $$CQI_i = \frac{\|H_i v_i\|^2}{\sigma_{full}^2} \quad \text{Equation 2}$$

In this case, CIM 140 may adjust the CQIs reported by the UE 108 to account for the difference in the total interference power and interference power outside of CoMP measurement set as follows:

$$CQI_i = \alpha * \frac{\|H_i v_i\|^2}{\sigma_{full}^2} \quad \text{Equation 3}$$

The parameter α is a correction coefficient that can be calculated by the CIM 140 at the network side using the following expression:

$$\frac{1}{\alpha} = 1 - \frac{\sigma_{in}^2}{\sigma_{full}^2}, \quad \text{Equation 4}$$

where $\sigma_{in}^2$ is a total interference generated by the nodes of the CoMP measurement set except for the serving node. $\sigma_{in}^2$ may also be referred to as cooperating node interference. In the general case, the information on $\sigma_{in}^2$ and $\sigma_{full}^2$ may not be available at the network side; however, various embodiments provide for their approximation from CoMP RRM measurement reports that are introduced for CoMP configuration. In particular, $\sigma_{in}^2$ may be approximated from reference signal received power (RSRP) reports $RSRP_i$ of CoMP measurement set as follows:

$$\sigma_{in}^2 = \sum_{i=2}^{N} \lambda_i * RSRP_i, \quad \text{Equation 5}$$

where $\lambda_i$ is a coefficient accounting for instantaneous PDSCH loading and $RSRP_i=(\|H_i\|^2)$, which is an RSRP report calculated at the UE using CSI-RS resource transmitted by the $i^{th}$ point. The PDSCH loading information may be available for CoMP schemes due to scheduling reports provided to CIM 140. For example, for the non-active points, the coefficient $\lambda_i$ can be set to 0, while for active points the coefficient $\lambda_i$ can be set to 1 to account for the points' contribution to the total interference power of the CoMP measurement set. Other integer and non-integer values of parameter $\lambda_i$ can be used to reflect partial loading and transmission of the reference signals that may collide with PDSCH of the considered UE. The parameter $\sigma_{full}^2$ can be derived from received signal strength indicator (RSSI) report and may be calculated from muted, e.g., zero-power, CSI-RS resource as shown in the following figure.

Figure 2:
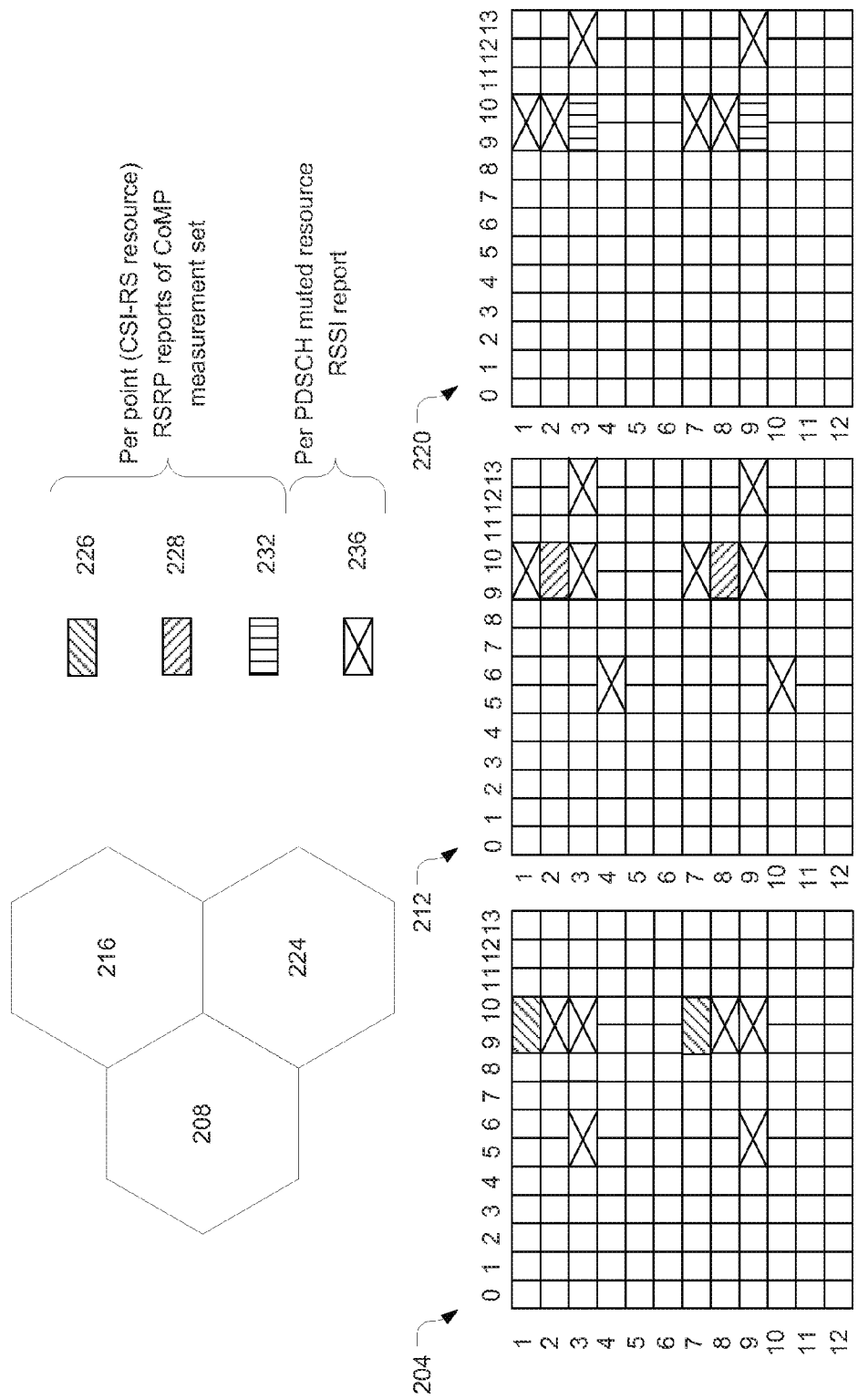
FIG. 2 schematically illustrates physical resource blocks of different sectors in accordance with various embodiments.

FIG. 2 schematically illustrates physical resource blocks (PRBs) of different sectors in accordance with various embodiments. In particular, PRB 204 corresponds with sector 208, PRB 212 corresponds with sector 216, and PRB 220 corresponds with sector 224. The PRBs are shown with orthogonal frequency division multiplex (OFDM) symbols numbered (0-13) across the top, and subcarriers numbered (1-12) down the side. A single OFDM symbol and subcarrier may be referred to as a resource element. In some embodiments, sector 208 may correspond to eNB 104, sector 216 may correspond to eNB 112, and sector 224 may correspond to eNB 116.

A PRB may include one or more CSI-RSs transmitted by the eNB of the corresponding sector that may be used, by the UEs, to determine CSI. For example, PRB 204 may include CSI-RSs 226 disposed in the ninth and tenth OFDM symbols of the first and seventh subcarriers; PRB 212 may include CSI-RSs 228 disposed in the ninth and tenth OFDM symbols of the second and eighth subcarriers; and PRB 220 may include CSI-RSs 232 disposed in the ninth and tenth OFDM symbols of the third and ninth subcarriers.

The PRBs may have PDSCH muted resources 236 that correspond to the CSI-RSs transmitted in other sectors. For example, PRB 204 may have PDSCH muted resources 236 on ninth and tenth OFDM symbols of second, third, eighth, and ninth subcarriers; PRB 212 may have PDSCH muted resources 236 on ninth and tenth OFDM symbols of first, third, seventh, and ninth subcarriers; etc.

The PRBs may further include PDSCH muted resources 236 at other resources to allow the UE, e.g., UE 108, to measure interference within the CoMP measurement set. For example, PRB 204 may include PDSCH muted resources 236 on fifth and sixth OFDM symbols of third and ninth subcarriers. This may allow the UE 108 to measure the interference from sectors 216 and 224, which may be transmitting on the corresponding resources.

Figure 3:
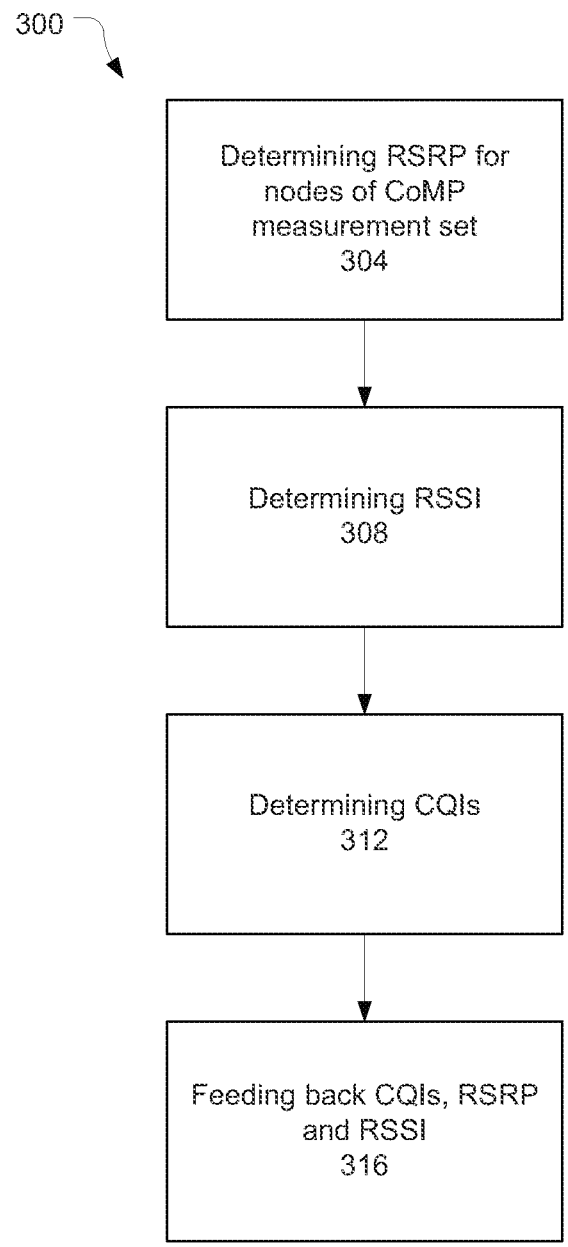
FIG. 3 is a flowchart illustrating determination and feedback of link adaptation feedback in accordance with various embodiments.

FIG. 3 is a flowchart illustrating an operation 300 performed by a channel measurement module, e.g., CMM 124, and feedback module, e.g., FM 126, in which link adaptation feedback is determined and fed back to a serving node, e.g., eNB 104 in accordance with some embodiments. The operation 300 may include, at block 304, determining RSRP for nodes of the CoMP measurement set. In various embodiments, the RSRP may be determined based on signal power of the CSI-RSs received from cooperating nodes of the CoMP measurement set. The signal power may be measured by the receiving UE. For example, the UE 108 may determine RSRP of eNB 112 by measuring receive power of CSI-RSs 228 of sector 216, and may determine RSRP for eNB 116 by measuring receive power of CSI-RSs 232 of sector 224. In some embodiments, RS may be determined for each node of the CoMP measurement set other than the serving node.

The operation 300 may further include, at block 308, determining RSSI. In various embodiments, the RSSI may be determined by a UE measuring signal power on resources that are muted in the UE's sector, but not muted or used for CSI-RS in the other sectors of the CoMP measurement set. For example, UE 108 may determine RSSI by measuring signal power on PDSCH muted resources 236 on the fifth and sixth OFDM symbols of the third and ninth subcarriers.

The operation 300 may further include, at block 312, determining CQIs. In various embodiments, the CQIs may be determined by a UE measuring signal power of one or more CSI-RSs. For example, UE 108 may determine CQI associated with serving node 152 by measuring signal power of CSI-RSs 226 on the ninth and tenth OFDM symbols of the first and seventh subcarriers. The UE 108 may determine CQI associated with cooperating node 112 by measuring signal power of CSI-RSs 228 in ninth and tenth OFDM symbols of the second and eighth subcarriers. The UE 108 may determine CQI associated with cooperating node 116 by measuring signal power of CSI-RSs 232 in ninth and tenth OFDM symbols of the third and ninth subcarriers.

The operation 300 may further include, at block 316, feeding back CQIs, RSRP and RSSI. CQIs, RSRP, and RSSI may collectively be referred to as link adaptation feedback. In various embodiments, the RSSI, RSRP, and CQIs may be fed back at different times and/or intervals. For example, CQIs may be fed back in CSI reports, while RSRP and/or RSSI may be fed back as periodic or event-triggered reports in CoMP RRM measurements.

The determining operations of blocks 304, 308, and 312 may be performed by CMM 124, for example, while the feedback operations of block 316 may be done by FM 126, for example.

Figure 4:
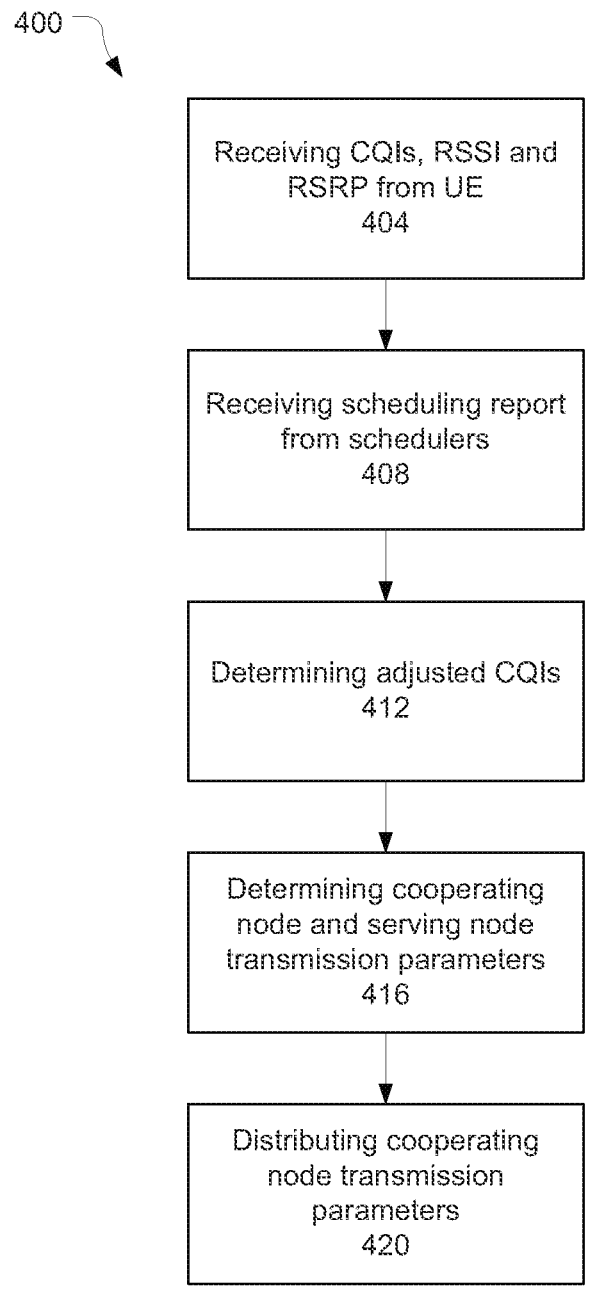
FIG. 4 is a flowchart illustrating link adaption operation of a base station in accordance with various embodiments.

FIG. 4 is a flowchart illustrating an operation 400 by channel interference module, e.g., CIM 140, and link adaptation module, e.g., LAM 144, in which channel interference is determined and various links are adapted by a serving node, e.g., eNB 104 in accordance with some embodiments. The operation 400 may include, at block 404, receiving CQIs, RSSI, and RSRP from UE 108. As previously described, the CQIs, RSSI, and RSRP may be received at different times and/or intervals.

The operation 400 may further include, at block 408, receiving scheduling reports from one or more schedulers of the CoMP measurement set. The scheduling reports may include information as to the loading of a PDSCH by the various nodes of the CoMP measurement set. In some embodiments, a scheduler may be disposed on each node of the CoMP measurement set and transmitted to the serving node by a high-speed fiber backhaul connection. In other embodiments, one or more centralized schedulers may be present.

The operation 400 may further include, at block 412, determining adjusted CQIs. The adjusted CQIs may be based on CQIs, RSSI, and RSRP received from the UE 108 along with the scheduling reports received from the schedulers. In particular, $\sigma_{full}^2$ may be determined based on the RSSI report and $\sigma_{in}^2$ may be based on the RSRP and the instantaneous loading of the PDSCH (from the scheduling reports) and as shown in Equation 5. $\sigma_{in}^2$ and $\sigma_{full}^2$ may then be used to determine the correction factor, α, as shown in Equation 4. The adjusted CQIs may then be determined based on the reported CQIs and the correction factor as shown in Equation 3.

The operation 400 may include, at block 416, determining cooperating node and serving node transmission parameters based on the adjusted CQIs. Determining the various transmission parameters may also be referred to as link adaptation in some embodiments.

The operation 400 may include, at block 420, distributing cooperating node transmission parameters to the various cooperating nodes of the CoMP measurement set.

The receiving and determining operations of blocks 404, 408, and 412, may be performed by a channel interference module, e.g., CIM 140, and the determining and distributing operations of blocks 416 and 420 may be performed by a link adaptation module, e.g., LAM 144.

Figure 5:
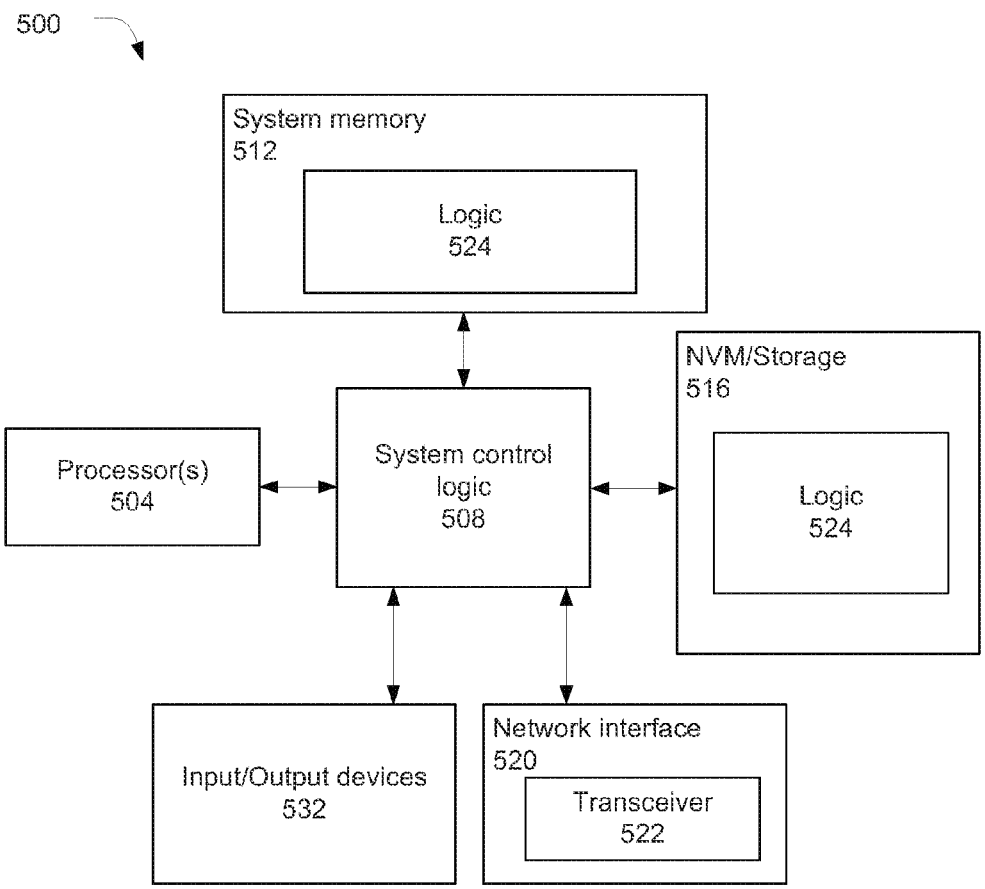
FIG. 5 schematically depicts an example system in accordance with various embodiments.

The modules described herein may be implemented into a system using any suitable hardware and/or software to configure as desired. FIG. 5 illustrates, for one embodiment, an example system 500 comprising one or more processor(s) 504, system control logic 508 coupled with at least one of the processor(s) 504, system memory 512 coupled with system control logic 508, non-volatile memory (NVM)/storage 516 coupled with system control logic 508, and a network interface 520 coupled with system control logic 508.

The processor(s) 504 may include one or more single-core or multi-core processors. The processor(s) 504 may include any combination of general-purpose processors and dedicated processors (e.g., graphics processors, application processors, baseband processors, etc.).

System control logic 508 for one embodiment may include any suitable interface controllers to provide for any suitable interface to at least one of the processor(s) 504 and/or to any suitable device or component in communication with system control logic 508.

System control logic 508 for one embodiment may include one or more memory controller(s) to provide an interface to system memory 512. System memory 512 may be used to load and store data and/or instructions, for example, for system 500. System memory 512 for one embodiment may include any suitable volatile memory, such as suitable dynamic random access memory (DRAM), for example.

NVM/storage 516 may include one or more tangible, non-transitory computer-readable media used to store data and/or instructions, for example. NVM/storage 516 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 516 may include a storage resource physically part of a device on which the system 500 is installed or it may be accessible by, but not necessarily a part of, the device. For example, the NVM/storage 516 may be accessed over a network via the network interface 520.

System memory 512 and NVM/storage 516 may respectively include, in particular, temporal and persistent copies of logic 524. The logic 524 may include instructions that when executed by at least one of the processor(s) 504 result in the system 500 implementing one or more modules, e.g., CMM 124, FM 126, CIM 140 and/or LAM 144 to perform corresponding operations described herein. In some embodiments, the logic 524, or hardware, firmware, and/or software components thereof, may additionally/alternatively be located in the system control logic 508, the network interface 520, and/or the processor(s) 504.

Network interface 520 may have a transceiver 522 to provide a radio interface for system 500 to communicate over one or more network(s) and/or with any other suitable device. The transceiver 522 may implement receiver module 120 and/or transmitter module 128. In various embodiments, the transceiver 522 may be integrated with other components of system 500. For example, the transceiver 522 may include a processor of the processor(s) 504, memory of the system memory 512, and NVM/Storage of NVM/Storage 516. Network interface 520 may include any suitable hardware and/or firmware. Network interface 520 may include a plurality of antennas to provide a multiple input, multiple output radio interface. Network interface 520 for one embodiment may include, for example, a network adapter, a wireless network adapter, a telephone modem, and/or a wireless modem.

For one embodiment, at least one of the processor(s) 504 may be packaged together with logic for one or more controller(s) of system control logic 508. For one embodiment, at least one of the processor(s) 504 may be packaged together with logic for one or more controllers of system control logic 508 to form a System in Package (SiP). For one embodiment, at least one of the processor(s) 504 may be integrated on the same die with logic for one or more controller(s) of system control logic 508. For one embodiment, at least one of the processor(s) 504 may be integrated on the same die with logic for one or more controller(s) of system control logic 508 to form a System on Chip (SoC).

The system 500 may further include input/output (I/O) devices 532. The I/O devices 532 may include user interfaces designed to enable user interaction with the system 500, peripheral component interfaces designed to enable peripheral component interaction with the system 500, and/or sensors designed to determine environmental conditions and/or location information related to the system 500.

In various embodiments, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard (e.g., virtual, projected, or physical keyboard).

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 520 to communicate with components of a positioning network, e.g., a global positioning system (GPS) satellite.

In various embodiments, the system 500 may be a mobile computing device such as, but not limited to, a laptop computing device, a tablet computing device, a netbook, a smartphone, etc. in various embodiments, system 500 may have more or less components, and/or different architectures.

In some embodiments, an apparatus, e.g., an eNB, is described that includes a channel interference module to receive, from a UE, RSRP information associated with a cooperating node of a CoMP measurement set, the cooperating node to coordinate with a serving node of the CoMP measurement set to facilitate wireless communication with the UE; receive, from the UE, a CQI; and determine an adjusted CQI based on the RSRP information and the CQI. The apparatus may further include a link adaptation module to adapt transmission parameters of a communication link associated with the cooperating node or the serving node based on the adjusted CQI.

In some embodiments, the channel interference module may receive, from the UE, a received signal strength indicator (RSSI) that indicates a measured signal power of a muted resource of a sector of the serving node; and determine the adjusted CQI based further on the RSSI.

In some embodiments, both the received CQI and the communication link may be associated with the cooperating node. If the cooperating node is a first cooperating node of the CoMP measurement set, the link adaptation module may also adapt transmission parameters of a communication link associated with a second cooperating node of the CoMP measurement set based on another adjusted CQI.

In some embodiments, both the received CQI and the communication link may be associated with the serving node.

In some embodiments, the channel interference module may receive the RSRP information as part of an RRM message.

In some embodiments, the channel interference module may receive RSRP information for a plurality of nodes of CoMP measurement set, e.g., all nodes of the CoMP measurement set except for the serving node; determine instantaneous loading of PDSCH for the plurality of nodes; and determine cooperating node interference of the plurality of nodes based on received RSRP information and instantaneous loading. The channel interference module determine total interference power on the PDSCH; determine correction coefficient based on determined total interference power and cooperating node interference power; and determine the adjusted CQI based on the CQI and the correction coefficient.

In some embodiments, the channel interference module may receive scheduling reports from one or more schedulers of the CoMP measurement set; and determine the instantaneous loading based on scheduling reports. The one or more schedulers may be respectively disposed on the plurality of nodes and the channel interference module may receive scheduling reports from the plurality of schedulers via one or more backhaul connections with the plurality of nodes.

In some embodiments, the adjusted CQI may be a first adjusted CQI, the CQI may be a first CQI associated with the cooperating node and the channel interference module may receive, from the UE, a second CQI associated with the serving node; and determine a second adjusted CQI based on the RSRP information and the second CQI. The channel interference module may determine the first and second adjusted CQI based on a correction coefficient.

In various embodiments, the apparatus may be a base station that operates as the serving node.

In some embodiments, an apparatus, e.g. a UE, is described to include a channel measurement module to receive a CSI-RS transmitted by a cooperating node of a CoMP measurement set; and determine a RSRP measurement for the cooperating node based on the CSI-RS; and a feedback module to feed back the RSRP measurement to a serving node of the CoMP measurement set as part of a RRM measurement report. The CSI-RS may be a first CSI-RS and the channel measurement module may determine a first channel quality indicator (CQI) based on the first CSI-RS; and receive a second CSI-RS, transmitted by the serving node, and determine a second CQI based on the second CSI-RS. The feedback module may feed back the first and second CQIs to the serving node. The first and second CQIs may be fed back separately from the RSRP measurement.

In some embodiments, the CSI-RS may be received over one or more resource elements of a PDSCH; the cooperating node may be associated with a first sector of the CoMP measurement; and sectors of the CoMP measurement set other than the first sector may include muted resources that correspond to the one or more resources elements.

In some embodiments, the apparatus may be disposed in a first sector of the CoMP measurement set and the channel measurement module may measure received signal strength on one or more resource elements of a PDSCH that are muted in the first sector to determine a RSSI. The feedback module may feed back the RSSI to the serving node.

In various embodiments, a method is disclosed that includes determining cooperating node interference power associated with one or more cooperating nodes of a CoMP measurement set; determining total interference power on a PDSCH; determining a correction coefficient based on the cooperating node interference power and the total interference power; and determining one or more adjusted CQIs based on the correction coefficient and one or more reported CQIs.

In various embodiments, the cooperating node interference power may be based on RSRP report received from a user equipment. The cooperating node interference power may be based on instantaneous loading of the PDSCH, which may be based on scheduling reports from one or more schedulers.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus comprising:
   a channel interference module, at least partially implemented in hardware, to:
      receive, from a user equipment (UE), reference signal receive power (RSRP) information associated with a cooperating node of a coordinated multipoint (CoMP) measurement set, the cooperating node to coordinate with a serving node of the CoMP measurement set to facilitate wireless communication with the UE;
      receive, from the UE, a channel quality indicator (CQI); and
      determine an adjusted CQI based on the RSRP information and the CQI; and
   a link adaptation module, at least partially implemented in hardware, to adapt transmission parameters of a communication link associated with the cooperating node or the serving node based on the adjusted CQI.

2. The apparatus of claim 1, wherein the channel interference module is to:
   receive, from the UE, a received signal strength indicator (RSSI) that indicates a measured signal power of a muted resource of a sector of the serving node; and
   determine the adjusted CQI based further on the RSSI.

3. The apparatus of claim 1, wherein the CQI and the communication link are associated with the cooperating node.

4. The apparatus of claim 3, wherein the cooperating node is a first cooperating node of the CoMP measurement set, and the link adaptation module is to further adapt transmission parameters of a communication link associated with a second cooperating node of the CoMP measurement set based on the adjusted CQI.

5. The apparatus of claim 1, wherein the CQI and the communication link are associated with the serving node.

6. The apparatus of claim 1, wherein the channel interference module is to receive the RSRP information as part of a radio resource management (RRM) message.

7. The apparatus of claim 1, wherein the channel interference module is to:
receive RSRP information for a plurality of nodes of CoMP measurement set;
determine instantaneous loading of physical downlink shared channel (PDSCH) for the plurality of nodes; and
determine cooperating node interference of the plurality of nodes based on received RSRP information and instantaneous loading.

8. The apparatus of claim 7, wherein the channel interference module is to:
determine total interference power on the PDSCH;
determine correction coefficient based on determined total interference power and cooperating node interference power; and
determine the adjusted CQI based on the CQI and the correction coefficient.

9. The apparatus of claim 7, wherein the plurality of nodes includes all nodes of the CoMP measurement set except for the serving node.

10. The apparatus of claim 7, wherein the channel interference module is to:
receive scheduling reports from one or more schedulers of the CoMP measurement set; and
determine the instantaneous loading based on scheduling reports.

11. The apparatus of claim 10, wherein the one or more schedulers comprise a plurality of schedulers respectively disposed on the plurality of nodes and the channel interference module is to:
receive scheduling reports from the plurality of schedulers via one or more backhaul connections with the plurality of nodes.

12. The apparatus of claim 1, wherein the adjusted CQI is a first adjusted CQI, the CQI is a first CQI associated with the cooperating node and the channel interference module is further configured to:
receive, from the UE, a second CQI associated with the serving node; and
determine a second adjusted CQI based on the RSRP information and the second CQI.

13. The apparatus of claim 12, wherein the channel interference module is to determine the first and second adjusted CQI based on a correction coefficient.

14. The apparatus of claim 1, comprising a base station to operate as the serving node.

15. An apparatus comprising:
a channel measurement module, at least partially implemented in hardware, to:
receive a channel state information reference signal (CSI-RS) transmitted by a cooperating node of a coordinated multipoint (CoMP) measurement set; and
determine a reference signal receive power (RSRP) measurement for the cooperating node based on the CSI-RS; and
a feedback module, at least partially implemented in hardware, to feed back the RSRP measurement to a serving node of the CoMP measurement set as part of a radio resource management (RRM) measurement report.

16. The apparatus of claim 15, wherein CSI-RS is a first CSI-RS and the channel measurement module is to:

determine a first channel quality indicator (CQI) based on the first CSI-RS; and
receive a second CSI-RS, transmitted by the serving node, and determine a second (CQI) based on the second CSI-RS.

17. The apparatus of claim 16, wherein the feedback module is to feed back the first and second CQIs to the serving node.

18. The apparatus of claim 17, wherein the feedback module is to feed back the first and second CQIs separately from the RSRP measurement.

19. The apparatus of claim 15, wherein:
the CSI-RS is to be received over one or more resource elements of a physical downlink shared channel (PDSCH);
the cooperating node is associated with a first sector of the CoMP measurement; and
sectors of the CoMP measurement set other than the first sector are to include muted resources that correspond to the one or more resources elements.

20. The apparatus of claim 15, wherein the apparatus is disposed in a first sector of the CoMP measurement set and the channel measurement module is to:
measure received signal strength on one or more resource elements of a physical downlink shared channel (PDSCH) that are muted in the first sector to determine a received signal strength indicator (RSSI).

21. The apparatus of claim 20, wherein the feedback module is to feed back the RSSI to the serving node.

22. The apparatus of claim 15, comprising a user equipment.

23. One or more non-transitory computer readable media having instructions that, when executed, cause a device to:
determine cooperating node interference power associated with one or more cooperating nodes of a coordinated multipoint (CoMP) measurement set;
determine total interference power on a physical downlink shared channel (PDSCH);
determine a correction coefficient based on the cooperating node interference power and the total interference power; and
determine one or more adjusted channel quality indicators (CQIs) based on the correction coefficient and one or more reported CQIs.

24. The one or more non-transitory computer readable media of claim 23, wherein the instructions further cause the device to:
determine cooperating node interference power based on reference signal receive power (RSRP) report received from a user equipment.

25. The one or more non-transitory computer readable media of claim 24, wherein the instructions further cause the device to:
determine cooperating node interference power based on instantaneous loading of the PDSCH.

26. The one or more non-transitory computer readable media of claim 25, wherein the instructions further cause the device to:
determine instantaneous loading of the PDSCH based on scheduling reports from one or more schedulers.

27. The one or more non-transitory computer readable media of claim 23, wherein the one or more CQIs include a first CQI associated with a serving node of the CoMP measurement set and a second CQI associated with a cooperating node of the CoMP measurement set.

* * * * *